Jan. 15, 1963
LE ROY E. JONES
3,073,369
TIRE CHAIN APPLICATOR AND RETAINER
Filed Nov. 6, 1961
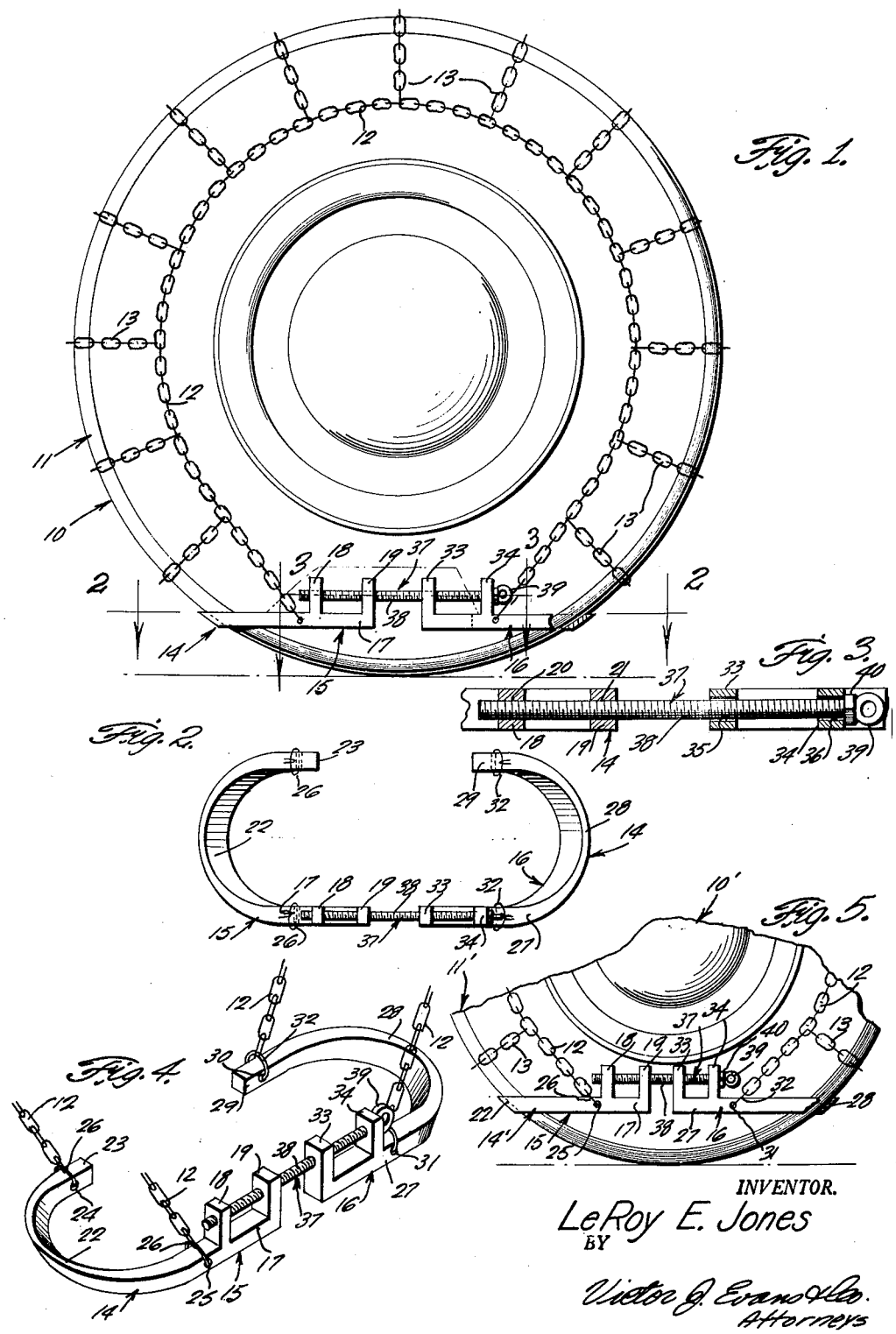
INVENTOR.
LeRoy E. Jones
BY
Victor J. Evans & Co.
Attorneys United States Patent Office 3,073,369
Patented Jan. 15, 1963

3,073,369
TIRE CHAIN APPLICATOR AND RETAINER
Le Roy E. Jones, 1501 N. Payson St.,
Baltimore 17, Md.
Filed Nov. 6, 1961, Ser. No. 150,445
1 Claim. (Cl. 152—213)

This invention relates to tire chains for use on vehicle wheels, and more particularly to a device for facilitating the application and retaining of tire chains on such vehicle wheels.

The primary object of this invention is to provide a device which is adapted to be used for facilitating the mounting or placement of tire chains on wheels of a vehicle and wherein with the present invention it is not necessary to jack up the vehicle in order to mount and clamp the tire chains on the wheels.

A further object is to provide a tire chain applying and retaining device which permits the tire chains to be applied and removed with ease and rapidity, and wherein the present invention will serve to maintain the tire chains tight, and wherein the device consists of parts that can be separated for easy installation and removal as desired or required.

Still another object is to provide such a tire chain applying and retaining device that is economical to manufacture and efficient in operation and which is rugged in structure and foolproof in use.

These and other objects of the invention will become apparent from a reading of the following specification and claim, together with the accompanying drawings, wherein like parts are referred to and indicated by like reference characters and wherein:

FIGURE 1 is a side elevational view illustrating the tire chain applicator and retainer of the present invention.

FIGURE 2 is a sectional view taken on the line 2—2 of FIGURE 1.

FIGURE 3 is an enlarged sectional view taken on the line 3—3 of FIGURE 1.

FIGURE 4 is a fragmentary perspective view illustrating certain constructional details of the present invention.

FIGURE 5 is a fragmentary side elevational view illustrating how the present invention can be used on tires of smaller or different sizes.

Referring in detail to the drawings, the numeral 10 indicates a conventional wheel which includes the usual tire 11, and as shown in the drawings side chains 12 are adapted to be mounted on the tire 11, and the pair of side chains 12 are interconnected by a plurality of spaced apart cross chains 13.

According to the present invention there is provided a tire chain applicator and retainer which is indicated generally by the numeral 14, and the device 14 of the present invention includes a pair of separate body members 15 and 16 which are adapted to be initially arranged in engagement with the lower portion of the tires 11.

As shown in FIGURE 4 for example, the body member 15 includes a support portion 17 which has a pair of spaced parallel lugs 18 and 19 extending upwardly therefrom and affixed thereto or formed integral therewith, and the lugs 18 and 19 are provided with registering threaded apertures 20 and 21, FIGURE 3, for a purpose to be later described. The support portion 17 merges into a curved end section 22, and the end section 22 is adapted to have a thin tapered or beveled configuration so as to snugly conform to the outer surface of the tire 11, and the curved end section 22 terminates or merges into a straight section 23, and the straight section 23 being arranged on the opposite side of the tire from the support portion 17. The straight section 23 is provided with an opening 24 therein, and the support portion 17 has a similar opening 25 therein, and clips or fasteners 26 are arranged in engagement with these openings 24 and 25, and end portions of the side chains 12 are adapted to be connected to the fasteners 26.

The body member 16 includes a support portion 27 which merges into a curved thin end section 28 that has a beveled or tapered formation to conform to the outer configuration of the tire 11, and the end section 28 terminates in a straight section 29 which is arranged on the outside of the tire from the support portion 27. Openings 30 and 31 are provided in the portions 29 and 27, and fasteners 32 engage the openings 30 and 31, whereby end portions of the side chains 12 can be readily connected to the fasteners 32. The numerals 33 and 34 indicate a pair of spaced parallel lugs which are secured to or formed integral with the support portion 27, and the lugs 33 and 34 have registering openings 35 and 36 therein which are not threaded, and the openings 35 and 36 are adapted to register with the threaded apertures 20 and 21.

The body members 15 and 16 are separate pieces or elements, and these body members are adapted to be operatively connected together by means of the screw member or bolt 37 which includes a threaded shank 38 that extends through the openings 36 and 35, and the shank 38 is arranged in threaded engagement with the apertures 21 and 20. The screw member 37 further includes an enlarged head 39, and the numeral 40 indicates a lock nut or shoulder which is adapted to be arranged on the screw member 37.

The numeral 10′ indicates a wheel which may be of a smaller size than the previously described wheel, and a correspondingly smaller tire 11′ is adapted to be mounted on the wheel 10′, and the applicator and retainer 14′ may be made to have a corresponding smaller size to fit such a smaller wheel 10′, and otherwise the construction and operation of the device 14′ is the same as described in connection with the previously described device 14.

From the foregoing, it is apparent that there has been provided a device which is especially suitable for applying and retaining tire chains on tires, as for example when a vehicle is to be operated or driven during inclement weather conditions such as those weather conditions resulting after the occurrence of snow or the like. In use with the parts arranged as shown in the drawings, it will be seen that the device 14 of the present invention is constructed so that it includes a pair of body members 15 and 16 which are provided with the curved end sections 22 and 28 respectively for engaging spaced apart portions of the tire 11, and ends of the side chains 12 are adapted to be connected to the members 15 and 16 as for example by means of fasteners 26 and 32 which engage the openings in the body members. The members 15 and 16 are clamped together by means of the screw member 37 which has its threaded shank 38 extending through the smooth openings 35 and 36 in the lugs 33 and 34, and the shank 38 is arranged in threaded engagement with the apertures 20 and 21 in the lugs 18 and 19 so that by properly rotating the screw member 37 and tightening the screw member, the body members 15 and 16 can be moved together in order to cause a clamping action to be exerted on the tire whereby the chains will be maintained in their desired position or location. When it is desired to remove the device and tire chains, for example when weather conditions clear up so that the need for tire chains is not present, the screw member 37 can be rotated in an opposite direction whereby the screw member 37 can be completely separated from the lugs 18 and 19 so that the members 15 and 16 can be detached and the members 15 and 16 can be removed from the tire and the chains 12 and 13 can be removed from the tire.

With the present invention it is not necessary to jack up the car when mounting the chains on the tire or when removing the chains from the tire, since with the present invention it is only necessary to drape the chains 12 and 13 over the tire, and then with the ends of the chains connected to the separate members 15 and 16, these members 15 and 16 can be moved into position and in engagement with portions of the tire 11 whereby the screw member 37 can be inserted through the registering openings 36 and 35 and 21 and 20 so that when the screw member 37 is properly rotated or tightened the members 15 and 16 will be clamped on the tire.

The enlargement 39 on the end of the screw member 37 is adapted to be used for facilitating the rotation of the screw member, and for example a suitable wrench or the like can be used for engaging the enlargement 39 for rotating the screw member 37, or else the screw member 37 may be made so that it can be manually operated or adjusted.

The parts can be made of any suitable material or in different shapes or sizes.

The device 14 of the present invention is constructed so that the parts can be readily adjusted as desired or required, and wherein with the parts arranged as shown in the drawings, accidental disengagement or displacement thereof from the tire will be prevented.

The present invention facilitates the job of putting on and removing tire chains, and wherein with the present invention it is not necessary to jack-up the wheels. The clamp or device 14 is adapted to be initially arranged below the grader diameter of the wheel as shown in FIGURE 1 so that when the screw member 37 is tightened, the chains are pulled tight. The parts can be completely separated so as to permit the parts to be conveniently stored when the device is not being used.

The projections or lugs 18, 19, 33 and 34 help stabilize the device and strengthen the device. The ends 26 and 28 are adapted to be made very thin so as to eliminate excessive bumping when the wheels are turning, and when the vehicle is being driven or operated.

It will therefore be seen that according to the present invention there has been provided a tire chain applicator and retainer for facilitating the application and tightening of chains on tires during snowy, icy conditions or the like, and with the present invention the wheel does not have to be jacked up since it is only necessary to mount or drape the tire chains over approximately three-fourths of the periphery of the tire, as for example as shown in FIGURE 1, and then with the members 15 and 16 in place as shown, the bolt or screw member 37 is adapted to be extended through the apertured lugs 34, 33, 19 and 18, and due to the provision of the threaded apertures 21 and 20, as well as the non-threaded openings 35 and 36, the screw member 37 can be rotated to tighten the members 15 and 16 on the tire. The curved end portions or sections 22 and 28 engage the lower outer periphery of the tire as shown in FIGURE 1. The device can be readily taken apart when not being used to fold up into a small unit for convenient storage or the like.

Although the invention herein described is fully capable of achieving the objects and providing the advantages hereinbefore mentioned, it is to be understood that it is merely illustrative of the presently preferred embodiment of the invention, and that the invention is not to be limited to the details of construction herein described other than as defined in the appended claim.

What is claimed is:

In a tire chain assembly including a pair of spaced apart side chains and a plurality of cross chains arranged in spaced relation between said side chains and each having each of its ends connected to the adjacent side chains, a device for connecting the free ends of each of said side chains together, said device comprising a pair of U-shaped body members, each of said members having one leg longer than the other leg, said members being horizontally disposed and arranged so that the legs of one body member face toward and are spaced from the legs of the other member with the long legs adjacent each other, a pair of upstanding lugs on each of said long legs, each lug of one leg being provided with a threaded hole, the lugs of the other leg being provided with smooth bores, a bolt extending through said bores and threadably engaged in said holes, one of said side chains having its free ends connected one each to the short leg of each member, the other of said side chains having its free ends connected one each to the long leg of each member.

References Cited in the file of this patent

UNITED STATES PATENTS

| | | |
|---|---|---|
| 1,741,785 | Lynch | Dec. 31, 1929 |
| 1,929,026 | Marcil | Oct. 3, 1933 |
| 2,472,768 | Carroll | June 7, 1949 |
| 2,655,972 | Doney | Oct. 20, 1953 |